United States Patent [19]

Wagner et al.

[11] Patent Number: 5,530,091

[45] Date of Patent: Jun. 25, 1996

[54] PROCESS FOR THE PRODUCTION OF POLYSUCCINIMIDE OR MALEIC AMIDE ACID

[75] Inventors: Paul Wagner, Düsseldorf; Dietrich Gehrmann; Thomas Bamberger, both of Leverkusen; Manfred Giltjes, Köln; Winfried Joentgen, Köln; Torsten Groth, Köln, all of Germany

[73] Assignee: Bayer Aktiengesellschaft, Leverkusen, Germany

[21] Appl. No.: 391,981

[22] Filed: Feb. 21, 1995

[30] Foreign Application Priority Data

Jul. 21, 1994 [DE] Germany .......................... 44 25 952.2

[51] Int. Cl.$^6$ .................................. C08G 69/10
[52] U.S. Cl. ...................... 528/328; 525/419; 525/420; 525/432; 525/539; 525/540; 528/363; 528/367
[58] Field of Search .................... 528/328, 363, 528/367; 525/419, 420, 432, 539, 540

[56] References Cited

U.S. PATENT DOCUMENTS

| | | | |
|---|---|---|---|
| 2,459,964 | 1/1949 | Robinson et al. | 562/574 |
| 5,329,020 | 7/1994 | Kalota et al. | 548/520 |
| 5,399,750 | 3/1995 | Brun et al. | 562/553 |

FOREIGN PATENT DOCUMENTS

| | | |
|---|---|---|
| 0578448 | 1/1994 | European Pat. Off. . |
| 0612784 | 8/1994 | European Pat. Off. . |
| 3626672 | 2/1988 | Germany . |
| 4305368 | 8/1994 | Germany . |
| 294843 | 3/1971 | U.S.S.R. . |
| 362821 | 2/1973 | U.S.S.R. . |
| 478308 | 1/1938 | United Kingdom . |
| 617810 | 2/1949 | United Kingdom . |

OTHER PUBLICATIONS

Literature: Patents Abstract of Japan C–991 Oct. 2, 1992 vol. 16/No. 473.

Primary Examiner—Shelley A. Dodson
Assistant Examiner—P. Hampton-Hightower
Attorney, Agent, or Firm—William C. Gerstenzang; Sprung Horn Kramer & Woods

[57] ABSTRACT

Molten maleic anhydride is introduced in the form of fine droplets at 53° C. to 250° C. and preferably at 60° C. to 120° C. into a gas atmosphere which consists either of pure gaseous ammonia or of a gas mixture of ammonia and at least one other gas and of which the temperature is between 20° C. and 500° C. The process is carried out at a temperature of 120° C. to 180° C. for the production of polysuccinimide and at a temperature of 10° C. to 120° C. for the production of maleic amide acid.

7 Claims, 1 Drawing Sheet

PROCESS FOR THE PRODUCTION OF POLYSUCCINIMIDE OR MALEIC AMIDE ACID

FIELD OF THE INVENTION

This invention relates to a process for the continuous production of polysuccinimide from maleic anhydride and ammonia. The polysuccinimide can be converted into polyaspartic acid (PAA) by a subsequent hydrolysis step.

In a variant of the process, maleic amide acid can be obtained from the same educts (maleic anhydride and ammonia).

BACKGROUND OF THE INVENTION

The production and use of polysuccinimide and polyaspartic acid and derivatives thereof has long been the subject of numerous publications and patents. Thus, they can be produced by thermal polycondensation of aspartic acid (J. Org. Chem. 26, 1084 (1961)).

U.S. Pat. No. 4,839,461 (=EP-A 0 256 366) describes the production of polyaspartic acid from maleic anhydride, water and ammonia. Maleic anhydride is converted into the monoammonium salt in aqueous medium by addition of concentrated ammonia solution. The monoammonium salt is melt-polymerized to polysuccinimide and converted by hydrolysis into PAA or a salt thereof, see also WO 93/23452.

It is known from U.S. Pat. No. 4,590,260 that amino acids can be subjected to polycondensation together with derivatives of malic, maleic and/or fumaric acid at temperatures of 100° to 225° C. According to U.S. Pat. No. 4,696,981, microwaves are used for such reactions.

DE-A 2 253 190 (=U.S. Pat. No. 3,846,380) describes a process for the production of polyamino acid derivatives, particularly polyaspartic acid derivatives, which—in addition to aspartic acid—uses maleic acid derivatives (monoammonium salt and monoamide) to produce the polysuccinimide by thermal polymerization; the polysuccinimide may then be converted into the required derivatives by reaction with amines in suitable solvents.

The reaction of maleic anhydride and ammonia to form maleic amide acid is also known. As disclosed in U.S. Pat. No. 2,459,964, maleic amide acid is obtained by introduction of ammonia into a solution of maleic anhydride in xylene, ethylene chloride, tetralin or dioxane at 50° to 100° C. and isolation of the amide acid precipitated by filtration.

DE-A 945 987 describes a process in which maleic anhydride is reacted with ammonia in the presence or absence of water to form maleic amide acid. In variants of this process, powdered maleic anhydride is introduced into a cooled 21% aqueous ammonia solution or powdered maleic anhydride is treated with gaseous ammonia.

The above-described processes which start out from maleic anhydride and ammonia are all attended by the disadvantage that they take place in solution, so that the reaction products have to be separated from the solution, or that they involve the handling and mixing of powder-form maleic anhydride which involves industrial hygiene problems and is complicated in terms of process technology.

SUMMARY OF THE INVENTION

Accordingly, the problem addressed by the present invention was to produce free-flowing, dry polysuccinimide or free-flowing maleic amide acid from maleic anhydride and ammonia in a simple apparatus designed for continuous operation.

DETAILED DESCRIPTION OF THE INVENTION

Figure 1:
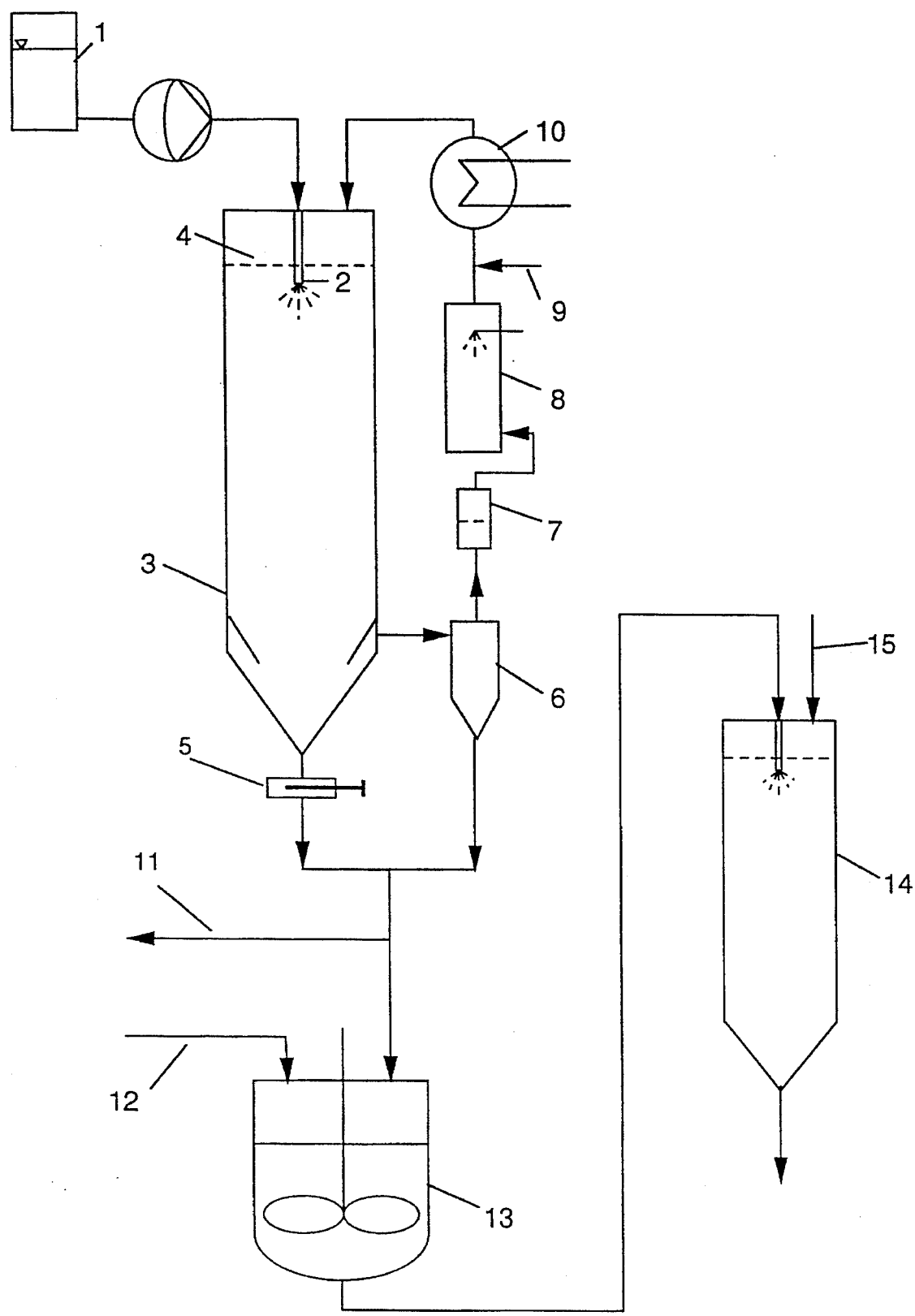

According to the invention, the solution to this problem is characterized in that molten maleic anhydride is introduced into a gas atmosphere in the form of fine liquid or vapor droplets at temperatures of 53° C. to 250° C. and preferably at temperatures of 60° C. to 120° C., the gas atmosphere consisting either of gaseous ammonia or of a gas mixture of ammonia and at least one other gas and having a temperature of 10° C. to 500° C. The nature of the products can be controlled through the gas temperature. The preferred temperature range for the production of polysuccinimide is 120° C. to 250° C., the preferred temperature range for the production of maleic amide acid being 10° C. to 120° C.

The pressure in the gas atmosphere is advantageously between 0.01 MPa and 20 MPa and preferably between 0.05 MPa and 1 MPa.

At low melt temperatures, preferably in the range from 60° C. to 120° C. (at 0.1 MPa), droplets with mean diameters of 5 μm to 5 mm and preferably from 20 μm to 200 μm can be produced with suitable atomizing elements (single-component nozzle, two-component nozzle, disk atomizer and priller). In this case, the reaction takes place in the liquid phase. At higher temperatures, preferably above 200° C., and under pressures of 0.05 to 1 MPa, the maleic anhydride evaporates or volatizes to a considerable extent during the spraying process and reacts in the gas phase to form fine condensate droplets of polysuccinimide (mean diameter 1–10 μm). The molten maleic anhydride may be introduced into the ammonia-containing atmosphere downwards from above, upwards from below (fountain method) or laterally into a reactor or spray drying tower (preferably downwards from above). The gas may be transported by or against the force of gravity (preferably by the force of gravity). The dimensions of the apparatus used and also the position of the point of introduction, the guiding and the rate of flow of the gas phase must be such that the droplets have a sufficient residence time in the gas phase for the reaction to take place. The water formed during the reaction to polysuccinimide evaporates or volatilizes and is removed from the gas phase. The reaction temperature and hence the nature of the products formed can be controlled by the temperature control of the gas phase. Accordingly, the gas phase is not only a reactant, it is also a temperature control medium and—in the production of polysuccinimide—a drying medium. It is best circulated, any water present being removed, the required temperature being established and the ammonia losses being compensated.

The polysuccinimide thus produced can be hydrolyzed to form a suspension containing polyaspartic acid. The hydrolysis is advantageously carried out at temperatures between 20° C. and the boiling point of the suspension containing polyaspartic acid and at a pH value in the range from 5 to 14. The hydrolysis is preferably carried out by addition of a base. Suitable bases are alkali metal and alkaline earth metal hydroxides or carbonates, for example sodium hydroxide, potassium hydroxide, soda or potassium carbonate, ammonia and amines, such as triethylamine, triethanolamine, diethylamine, diethanolamine, alkylamines, etc.

The maleic amide acid produced by this process can be polymerized by application of heat to form polysuccinimide.

The invention affords the following advantages:

The fine dispersion of the maleic anhydride in the gaseous ammonia stream creates large reaction surfaces so that a fast reaction takes place.

In the production of polysuccinimide, no other polymerization steps are necessary in contrast to known processes. The polysuccinimide is obtained as a free-flowing end product in the first process step and may then be readily further processed. The water formed during the reaction evaporates or volatilizes and can be removed from the reaction zone with the gas phase.

In the production of maleic amide acid, the acid is obtained in free-flowing form in a single process step.

A BRIEF DESCRIPTION OF THE DRAWING

The invention is described in more detail in the following with reference to a possible flow chart (using a one-component nozzle) shown in FIG. 1. The invention is also illustrated by Examples.

The maleic anhydride is melted in a holding tank 1 at temperatures of 60° C. to 120° C. and delivered through a pipe with protective heating to a one-component nozzle 2 which projects from above into a spray drying tower 3. Ammonia which may contain residues of water flows continuously downwards through the spray drying tower 3 with a temperature of 10° C. to 250° C. A distributor plate 4 provides for uniform and eddy-free flow. The polysuccinimide or maleic amide acid particles formed accumulate in the cone of the spraying tower and can be removed through a shutoff slide 5. The gas stream leaving the spray drying tower is freed from entrained particles in a cyclone 6 and a filter 7. The particles removed are combined in 11 with the material removed via the shutoff slide. In the production of polysuccinimide, the water formed has to be removed in a washer 8. Losses of ammonia can be replaced through the introduction of fresh ammonia through the pipe 9. Finally, a heat exchanger 10 heats the ammonia to the required temperature before it is returned (recycled) to the spray drying tower 3.

The hydrolysis of the polysuccinimide to polyaspartic acid Na salt is carried out by addition of sodium hydroxide 12 in a stirred tank 13, the polyaspartic acid Na salt solution being sprayed with preheated air 15 in another spray drying tower 14 (air entry temperature 180° C., exit temperature 80° C).

Instead of the one-component nozzle 2, two-component nozzles, disk atomizers or prillers may also be used to atomize the molten maleic anhydride. Mean droplet diameters of 1 μm to 5 mm can be adjusted. However, the optimal range for the mean droplet diameter is between 20 μm and 200 μm.

Instead of pure ammonia, the gas phase may also consist of a mixture of ammonia and at least one other gas. The molten maleic anhydride may also be introduced into the ammonia-containing atmosphere downwards from above (fountain method) or through a pipe arranged laterally on the spraying tower 3. The gas may be guided in countercurrent to or parallel current with the liquid sprayed in. The dimensions of the apparatus used and also the position of the point of introduction (spray nozzle), the guiding and the rate of flow of the gas must be such that the sprayed maleic anhydride droplets have a sufficient residence time in the gas phase for the reaction to take place. For example, the residence time should be between 5 s and 50 s. The ratio of the total gas volume to the quantity of maleic anhydride (MA) sprayed in should be selected so that a sufficient quantity of $NH_3$ is available for the reaction. This means that the ratio of the $NH_3$ flow rate to the MA flow rate should be from 1 to 12 (mole/mole) and preferably 1 to 6 (mole/mole). In addition, the reaction temperature has to be adjusted with the gas and, in the production of polysuccinimide, the water formed has to be removed. To this end, the ratio of mass flow of gas to mass flow of MA must be 0.17 to 20 (kg/kg) and preferably 0.5 to 10 (kg/kg).

The recycled gas phase can be temperature-controlled by means of the heat exchanger 10. In this way, the reaction temperature and hence the nature of the products formed can also be controlled. Accordingly, the gas phase is not only a reactant, but is also a temperature control medium and, in the production of polysuccinimide, a drying medium. During recirculation (recycling), the water formed during the production of polysuccinimide is removed (washer 8), the required temperature is established (heat exchanger 10) and the ammonia losses are replaced (ammonia inlet 9).

EXAMPLES

EXAMPLE 1

2.6 kg/h of molten maleic anhydride with a temperature of around 100° C. is sprayed from above through a two-component nozzle (type 951 manufactured by the Schlick Company of Coburg) into a 6 m tall spray drying tower together with 2.6 kg/h of a gas mixture of 0.173 part by weight of ammonia and 0.827 part by weight of nitrogen with a temperature of around 40° C. The pressure in the tower is 0.102 MPa. The product collected at the bottom of the spray drying tower shows a conversion of 95.4% to maleic amide acid.

EXAMPLE 2

10.4 kg/h of molten maleic anhydride with a temperature of around 110° C. are sprayed from above through a two-component nozzle (type 943 manufactured by the Schlick Company of Coburg) into a 6 m tall spray drying tower together with 7 kg/h of a gas mixture of 0.886 part by weight of ammonia and 0.114 part by weight of nitrogen with a temperature of around 40° C. At the same time, 9 kg/h of nitrogen with a temperature of 156° C. flows downwards through the spray drying tower. The pressure in the tower is 0.102 MPa. The product collected at the bottom of the spray drying tower shows a conversion of 53.4% to polysuccinimide.

EXAMPLE 3

15.2 kg/h of molten maleic anhydride with a temperature of around 95° C. is sprayed from above through a one-component nozzle (type 121 manufactured by the Schlick Company of Coburg; bore diameter 0.8 mm) into a 6 m tall spray drying tower under a pressure of 0.45 MPa. At the same time, 10.8 kg/h of ammonia with a temperature of 160° C. flows downwards through the spray drying tower. The pressure in the tower is 0.102 MPa. The product collected at the bottom of the spray drying tower shows a conversion of 50.3% to polysuccinimide.

The product produced by the process described above can be converted into the polyaspartic acid Na salt by alkaline hydrolysis with 48.8% sodium hydroxide. To this end, the polysuccinimide and the sodium hydroxide in a mass ratio of 1:0.74 (polysuccinimide:sodium hydroxide) are simultaneously introduced at temperatures of 50° C. to 60° C. into the tank 13 which contains water in a quantity of 0.59 times the weight of the polysuccinimide, the pH not exceeding 9. During the dissolution of the polysuccinimide, the imide units must be completely hydrolyzed without hydrolysis of the amide bonds of the polymer chain. The approximately 50% solution prepared (density at 20° C.=1.342, pH=8.4) can be spray-dried (spray dryer 14).

We claim:

1. A process for the continuous production of polysuccinimide from maleic anhydride and ammonia, whereby molten maleic anhydride is introduced into a gas atmosphere as a spray of molten maleic anhydride droplets at temperatures of 53° C. to 250° C., the gas atmosphere comprising gaseous ammonia and having a temperature of 10° C. to 500° C., and wherein the ratio of mass flow of said gas mixture to mass flow of maleic anhydride is from 0.17 to 20 Kg/Kg.

2. A process as claimed in claim 1, characterized in that it is carried out at a temperature of 120° C. to 250° C.

3. A process as claimed in claim 1, characterized in that the pressure in the gas atmosphere is between 0.01 MPa and 20 MPa and preferably between 0.05 MPa and 1 MPa.

4. A process as claimed in claim 1 wherein the molten maleic anhydride is sprayed into a spray drying tower (3) through which ammonia continuously flows and wherein particles consisting of polysuccinimide collect in the cone of the spray drying tower and the ammonia is recycled to the spray drying tower (3).

5. A process as claimed in claim 1, characterized in that the resulting polysuccinimide is hydrolyzed to form a suspension containing polyaspartic acid.

6. A process as claimed in claim 5, characterized in that the hydrolysis is carried out by addition of a base.

7. A process as claimed in claim 5, characterized in that the hydrolysis is carried out at temperatures between 20° C. and the boiling point of the suspension between 20° C. and the boiling point of the suspension containing polyaspartic acid and at a pH value of 5 to 14.

* * * * *